Figure 2:

Dec. 26, 1939.  J. T. EASH ET AL  2,184,518
WELDING ROD AND HARD OVERLAY DEPOSITED THEREFROM
Filed July 27, 1938   2 Sheets-Sheet 1

INVENTORS
JOHN T. EASH
BY THOMAS J. WOOD
ATTORNEY

CARBIDE
MARTENSITE
AUSTENITE

CARBIDE
TROOSTITE
SORBITE

PEARLITE
FERRITE
GRAPHITE

INVENTORS
JOHN T. EASH
BY THOMAS J. WOOD
ATTORNEY

Patented Dec. 26, 1939

2,184,518

UNITED STATES PATENT OFFICE 2,184,518

WELDING ROD AND HARD OVERLAY DEPOSITED THEREFROM

John Trimble Eash, Cranford, and Thomas J. Wood, Nutley, N. J., assignors to The International Nickel Company, Inc., New York, N. Y., a corporation of Delaware Application July 27, 1938, Serial No. 221,514

22 Claims. (Cl. 219—8)

The present invention relates to a welding rod or element particularly adapted for use in producing hard, wear resistant, welded overlays and to metallic articles having a dense, gas-free layer of hard, wear resistant metal bonded thereto by deposition from the said welding rod.

In recent years, a large industry has developed concerned with the production of surfaces with higher resistance to wear and abrasion than the base or foundation structures which support hard surface material. Mining machines, excavating machines, crushers, grinders, rolls and other mechanical equipment which must have high tensile and impact strengths have been provided with cutting, digging or bearing surfaces which possess considerably higher resistance to abrasion than the core metal upon which the wearing surface is deposited. It has also been found advantageous to repair or replace the surfaces of parts of machines subjected to excessive wear with a coating possessing a very high Brinell hardness after the original surface has been destroyed by abrasion or similar action but before the entire machine has failed. In this manner, the useful life of mechanical-shovel buckets, drag-line bucket teeth, and similar parts of many pieces of mechanical equipment has been extended with appreciable savings to the operators.

A number of alloys have been proposed for this purpose. Few of these alloys possess a hardness above about 550 Brinell and the upper limit of hardness appeared to be about 600 Brinell to about 700 Brinell. Not only were the alloys formerly used very expensive but many of the compositions produced deposits which were porous and spongy except when applied by skilled operators. Many of the materials offered to the trade at the present time require a coating to act as a flux or for similar purposes. These element coatings introduce operating difficulties.

It is well known in the art that there is great difficulty encountered in producing dense, gas-free overlays possessing high hardness in a practical manner. For a satisfactory overlay, the surface and the internal structure must be substantially non-porous, dense and gas-free. The materials from which the overlays are produced must be easily workable with no slag interference or with a small amount of self-floating slag. The penetration of the overlays into the base must be such that the metallic deposit adheres firmly and tenaciously to the base. The overlay must be tough as well as hard to insure that the coating will not spall off. The appearance of the finished overlay must be bright and clean and free from any occlusions of slag, etc.

Welded overlays have usually been applied by melting the weld metal onto the base metal with an electric arc or a gas flame, e. g., an oxy-acetylene flame. The conditions which affected the nature of the welded overlay were not identical in the two cases. It was possible, for example, in the case of gas welding, to adjust the flame so as to produce a neutral or reducing atmosphere about the molten metal whereas no comparable result could be obtained by adjusting an electric arc.

It has been assumed that due to the high temperatures necessary for successfully depositing hard, dense, gas-free coatings on iron and steel objects by arc welding that oxidation of the metals of the molten overlay took place at a rapid rate. As a result, it has been assumed, various oxides were formed which in turn produced large amounts of gas as the metal cooled. These gases, at least in part, were frozen in place causing a porous internal structure to exist and a rough, pock-marked surface given to the overlay. In addition, the removal of impurities was considered essential to the production of satisfactory overlays of high hardness, toughness and strong adherence to the base. For these and other reasons, the majority of electric arc welding rods were provided with coatings designed to overcome the difficulties arising from the formation of oxides, etc. A third advantage which was thought to arise from the use of rods with protective layers was the protection of the stream of molten metal and the overlay from the atmosphere. Many attempts have been made to produce satisfactory gas-free, dense surfaces on iron and steel objects by electric arc welding using materials in the form of rods coated with a protective layer. Favorite ingredients in protective layers for arc welding rods were silica, calcium fluoride, calcium carbonate, sodium carbonate, and sodium acid carbonate in various numbers and amounts, usually in combination with a binder, such as shellac, sodium or potassium silicate, etc. None of the electric arc welding rods provided with such protective coatings, particularly when applied to hard nickel cast iron rods, have been found to give wholly satisfactory, gas-free dense overlays which were tough, hard and clung tenaciously to the base.

Some of the protective layers containing the above mentioned ingredients melted so rapidly that the molten materials from the protective layer interfered with laying down the metallic deposit. The materials of other protective layers formulated in accordance with other formulae were so refractory that no beneficial result was obtained.

A protective layer of a glass type having the following compositions has been tried on hard nickel cast iron arc welding rods:

70% $SiO_2$+17% CaO+13% $Na_2O$ with shellac as a binder. (Melting point about 2000° F.)
70% $SiO_2$+12% CaO+18% $Na_2O$ with shellac as a binder. (Melting point about 1830° F.)

With these protective layers, some porosity developed in the overlay. However, there was considerable interference from slag with the result that the final overlay was irregular and deeply pitted.

Similar protective coatings were formed on other overlay elements having compositions corresponding to the following with lower melting points to produce more fluid slags:

10% $Na_3AlF_6$+63% $SiO_2$+15.3% CaO+11.7% $Na_2O$ with shellac as a binder.

A composition similar to that of the above except that all the materials entering into the protective layer were especially dehydrated.

72% $SiO_2$+26% $Na_2O$+2% CaO with shellac as a binder. (Melting point about 1470° F.)

Overlays built up of nickel cast iron with protective coatings of the above compositions were pitted and unsatisfactory.

It is apparent from the foregoing discussion that providing arc welding rods, particularly of the nickel cast iron type with a protective coating does not eliminate the difficulties arising when attempting to produce smooth, dense, gas-free overlays having high hardness, adhering tenaciously to the base. Trouble has arisen from the use of some commercial hard surfacing elements supplied with coatings due to the spalling off of the coating before using and also the slagging difficulties noted above. Thus, although many attempts have been made to provide the art with a satisfactory element for producing dense, gas-free, tenacious overlays having especially high Brinell hardnesses, none, so far as we are aware, has been wholly successful and satisfactory when carried into practice on a commercial scale.

We have discovered that satisfactory dense, gas-free nickel-chromium cast iron overlays can be deposited upon iron and steel articles which adhere tenaciously to the base, have an exceptionally high Brinell hardness, are not pitted, and have a good clean appearance.

It is an object of the present invention to provide nickel-chromium cast iron welding rods or elements of suitable composition for depositing dense, gas-free surfaces of high Brinell upon steel and iron surfaces.

It is a further object of the present invention to provide a welding rod capable of use for depositing a plurality of dense-gas-free nickel-chromium cast iron coatings of high Brinell upon massive steel and iron articles.

The present invention also contemplates the provision of nickel cast iron welding rods or elements substantially devoid of protective coatings suitable for use in depositing metallic overlays having especially high Brinell hardness, being dense and gas-free and adhering tenaciously to the base.

It is also within the scope of the present invention to provide nickel cast iron welding rods or elements containing boron, aluminum, or aluminum and boron for electric arc welding, and nickel cast iron welding rods or elements containing calcium and lithium or boron, calcium and lithium for oxy-acetylene welding from which sound, dense, gas-free overlays having an especially high Brinell hardness and adhering tenaciously to the steel or iron base may be deposited.

It is further within the contemplation of the invention to provide welding rods having relatively low alloy content that may be used by operators of ordinary skill to lay down dense, gas-free, adherent overlays of high hardness at a fraction of the cost heretofore expended to produce welded overlays of comparable hardness from highly alloyed welding rods.

Figure 1:
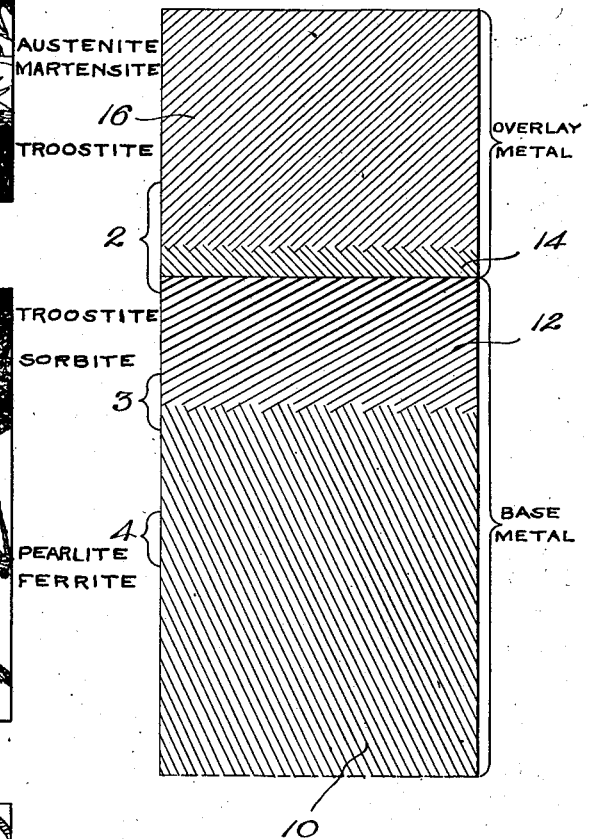

Other objects and advantages will become apparent from the following description of preferred embodiments of the invention, taken in conjunction with the accompanying drawings in which:

Fig. 1 represents schematically a cross section through a welded overlay on a steel base, depicting the various layers or strata of distinct metallographic structure which are produced when a hard overlay is laid down on a steel base in accordance with the present invention.

Figure 3:
Figure 4:

Figs. 2, 3 and 4 are reproductions of photomicrographs taken at a magnification of about 500 diameters substantially in the regions designated by reference numerals 2, 3 and 4, respectively, in Fig. 1.

Figure 7:
Figure 5:
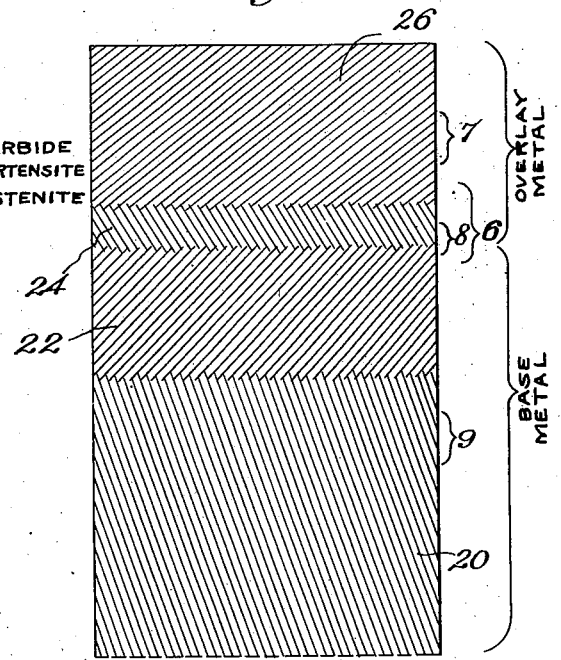
Figure 8:
Figure 6:
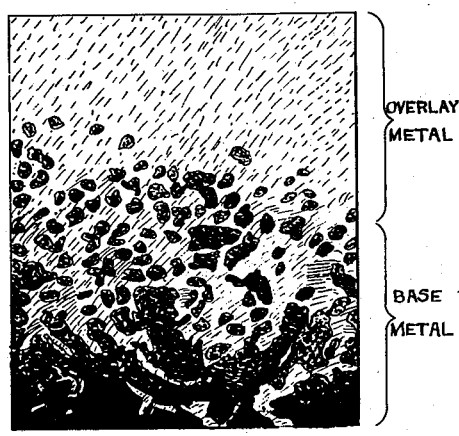
Figure 9:

Fig. 5 represents schematically a cross section through a welded overlay on a cast iron base with the various layers or strata of distinct metallographic structure depicted which are produced when a hard overlay is laid down on a cast iron base in accordance with the present invention;

Fig. 6 is a reproduction of a photomicrograph taken at a magnification of about 100 diameters in the region designated by reference numeral 6 in Fig. 5; and Figs. 7, 8 and 9 are reproductions of photomicrographs taken at a magnification of about 500 diameters in the regions designated by reference characters 7, 8 and 9, respectively, in Fig. 5. All specimens were polished and etched with about 4% Nital.

In general, the production of satisfactory gas-free, sound, dense and adherent overlay deposits is not entirely dependent upon incorporating a deoxidizer with the nickel cast iron starting material. Silicon, for example, is a good deoxidizer, but its use in relatively large amounts as a deoxidizing constituent of a nickel cast iron overlay element has been found to be inadequate to produce satisfactory overlays. It is well known that titanium, calcium and lithium are also excellent deoxidizers, yet nickel cast iron overlay elements in which titanium, calcium or lithium had been incorporated separately in the welding element did not produce satisfactory sound, dense, gas-free overlays. Typical examples of the results are set forth in Table I.

el cast iron weld rods containing about 3.4% carbon, 1% silicon, 3.75% nickel, 1.25% chromium

*Table I*

| Rod No. | Composition of rod* | | | | | Method of depositing | Soundness | |
|---|---|---|---|---|---|---|---|---|
| | TC | Si | Ni | Cr | Deoxidizing agent | | On steel base | On cast iron base |
| 1 | 3.4 | 1.0 | 4.5 | 1.5 | .5 Ti | E | Unsatisfactory | Unsatisfactory. |
|  |  |  |  |  |  | R | do | Do. |
| 2 | 3.4 | 1.0 | 4.5 | 1.5 | .5 Ca | E | do | Do. |
|  |  |  |  |  |  | R | do | Do. |
| 3 | 3.4 | 1.0 | 4.5 | 1.5 | .5 Li | E | do | Do. |
|  |  |  |  |  |  | R | do | Do. |

*The balance in each case was essentially iron.
E = Electric arc with reversed polarity.
R = Reducing oxy-acetylene flame.

None of these welded overlays would have been satisfactory and acceptable commercially due to the porous structure of the overlay.

It was found, however, that satisfactory overlays could be deposited by the oxy-acetylene flame when the weld rod contained a special densifying agent comprising both lithium and calcium provided the phosphorus content was maintained below about 0.30% and particularly below about 0.20% as shown in Table II.

and the balance essentially iron to which between 0.25% and 0.50% aluminum had been added produced satisfactory sound, dense, hard overlays.

The addition of boron, for example, in the form of commercial ferro-boron, to the above mentioned alloys that had been treated with the special densifying agent of the calcium-lithium alloy or aluminum resulted in weld rods of very satisfactory performance and provided, moreover, a simple means for adjusting the hardness of

*Table II*

| Rod No. | Composition of rod* | | | | | | Welding characteristics | | | |
|---|---|---|---|---|---|---|---|---|---|---|
| | TC | Si | Ni | Cr | P | Ca*** Li | On steel base | | On cast iron base | |
| | | | | | | | Soundness | Workability | Soundness | Workability |
| 4 | 3.17 | 0.71 | 4.49 | 1.27 | .19 | .5 | S | E | S | S. |
| 5 | 3.24 | 0.68 | 4.53 | 1.35 | .22 | .5 | S. P | E | S. P | S. |
| 6 | 3.4 | 1.0 | 4.5 | 1.5 | .30 | .8 | U | G | U | F. |
| 7 | 3.4 | 1.0 | 4.5 | 1.5 | .30 | .5 | U | E | U | F. |
| 8 | 3.4 | 1.0 | 3.75 | 1.25 | .30 | .25 | U | G | U | F. |
| 9 | 3.4 | 1.0 | 4.5 | 1.5 | **.35 | .5 | U | F | U | F. |
| 10 | 3.59 | 1.0 | 4.5 | 1.5 | .13 | .5 | S | E | S | G. |
| 11 | 3.41 | 0.96 | 4.54 | 1.48 | .13 | .5 | S | E | S | G. |
| 11a | 3.4 | 1.0 | 4.5 | 1.5 | .13 | .25 | S | E | S | S. |
| 11b | 3.4 | 1.0 | 4.5 | 1.5 | .13 | .80 | S | E | S | VG. |

*The balance in each case was essentially iron.
**Added specially to low phosphorus melt.
***Added as a 50-50 calcium-lithium alloy.
S = Satisfactory.
S. P. = Slight porosity.
U = Unsatisfactory.
E = Excellent.
G = Good.
VG = Very good.
F = Fair.

It was also discovered that satisfactory overlays could be laid down by the electric arc method if the nickel cast iron weld rod contained aluminum as a special densifying agent. For example, nickthe welded overlay to meet varying service requirements. Typical results are set forth in Table III for rods having the compositions indicated in Table IV.

*Table III*

| Rod No. | Deposited by | Welding characteristics | | | | | |
|---|---|---|---|---|---|---|---|
| | | On steel base | | | On cast iron base | | |
| | | Brinell range | Soundness | Workability | Brinell range | Soundness | Workability |
| 12 | R | 455-505 | Satisfactory | Excellent | 625-650 | Satisfactory | Good. |
| 13 | R | 550-650 | do | do | 625-650 | do | Do. |
| 14 | R | 650-720 | do | do | (*) | (*) | (*). |
| 15 | E | 600-675 | do | do | 545-580 | Satisfactory | Good. |
| 16 | E | 590-650 | do | do | 500-580 | do | Do. |
| 17 | E | 650-690 | do | do | (*) | (*) | (*). |
| 18 | E | 685-760 | do | do | 675-715 | Satisfactory | Good. |
| 19 | C | 600-650 | do | Satisfactory | 710-715 | do | Fair. |
| 20 | E | 640-700 | do | Excellent | 635-730 | do | Good. |
| 21 | C | 440-580 | do | Satisfactory | (*) | (*) | (*). |

R = Reducing oxy-acetylene flame.
E = Electric arc with reversed polarity.

Table IV

| Rod No. | Composition of rod* | | | | | Special densifying agent |
|---|---|---|---|---|---|---|
| | TC | Si | Ni | Cr | B** | |
| 12 | 3.19 | 1.0 | 4.5 | 1.5 | -- | 0.5 Ca Li. |
| 13 | 3.4 | 1.0 | 4.5 | 1.5 | -- | 0.5 Ca Li. |
| 14 | 3.41 | 1.0 | 4.30 | 1.47 | 0.5 | 0.5 Ca Li. |
| 15 | 3.42 | 1.0 | 3.75 | 1.25 | -- | 0.25 Al. |
| 16 | 3.36 | 1.0 | 3.75 | 1.25 | -- | 0.50 Al. |
| 17 | 2.7 | 1.0 | 3.75 | 1.25 | 0.5 | 0.25 Al. |
| 18 | 3.39 | 1.0 | 3.75 | 1.25 | 0.5 | 0.5 Al. |
| 19 | 3.83 | 1.0 | 3.75 | 1.25 | 0.5 | 0.5 Al. |
| 20 | 3.71 | 1.0 | 3.75 | 1.25 | 0.5 | 0.5 Al. |
| 21 | 3.52 | 1.0 | 4.5 | 1.5 | -- | 0.5 Ca Li. |

*The balance in each case was essentially iron.
**Added as commercial ferro-boron.
-- Element not added to the composition.

It has been found that electric arc welding elements constituted of a nickel cast iron containing chromium produce satisfactory dense, gas-free overlays when about .15% to about .50% aluminum is incorporated or when about .15% to about 0.50% of aluminum and about .15% to about 0.50% of boron are added. Satisfactory results with the electric arc have been obtained with welding elements of the following composition:

|  | Per cent |
|---|---|
| Carbon | about 3.5 |
| Silicon | do 1.0 |
| Nickel | do 3.75 |
| Chromium | do 1.25 |
| Manganese | do 0.4 |
| Sulphur | maximum 0.10 |
| Phosphorus | do 0.20 |
| Aluminum | about 0.5 |
| With or without boron | do 0.5 |
| Iron | Balance |

For use with the oxy-acetylene torch or similar means of depositing overlays using gas flames as the source of heat, it has been found that welding elements having the following composition give satisfactory results.

|  | Per cent |
|---|---|
| Carbon | about 3.50 |
| Silicon | do 1.00 |
| Nickel | do 4.50 |
| Chromium | do 1.50 |
| Manganese | do 0.40 |
| Calcium | do 0.10 |
| Lithium | do 0.10 |
| Sulphur | maximum 0.10 |
| Phosphorus | do 0.20 |
| With or without boron | about 0.50 |
| Iron | Balance |

In the production of welding elements containing aluminum and/or boron, it has been found that the following procedure has given satisfactory results. A molten bath of approximately the following composition is produced:

|  | Per cent |
|---|---|
| Carbon | 3.30 to 3.75 |
| Silicon | .70 to 1.00 |
| Nickel | 3.50 to 3.80 |
| Chromium | 1.15 to 1.45 |
| Manganese | .25 to .50 |
| Phosphorus | maximum 0.20 |
| Sulfur | do 0.10 |
| Iron | Balance |

Small amounts of a 50/50 calcium-lithium alloy up to a total of about 0.05% by weight of the melt may be introduced on the surface of the melt to facilitate the incorporation of commercial ferro-boron, or other suitable boron containing reagent, up to about 0.5% boron. Of course, any method of introducing the calcium-lithium alloy may be employed. After the addition of about 0.5% boron the temperature of the melt is raised to about 2750° to about 2800° F. and an addition of about 0.5% aluminum is made. Immediately thereafter, the melt is poured and castings are made of any convenient size and shape for producing overlay or welding elements.

To produce satisfactory welding rods containing calcium-lithium and, if desired, boron, a base melt which will yield castings of the following composition has been found to give satisfactory results:

|  | Per cent |
|---|---|
| Carbon | 3.30 to 3.60 |
| Silicon | .70 to 1.00 |
| Nickel | 4.30 to 4.65 |
| Chromium | 1.40 to 1.70 |
| Manganese | .25 to .50 |
| Phosphorus | maximum 0.20 |
| Sulfur | do 0.10 |
| Iron | Balance |

The ferrous alloy base is heated until molten and an addition of about 0.15 to 0.50% of a 50/50 calcium-lithium alloy made at a temperature of about 2300° to about 2400° F. by plunging pieces of the alloy wrapped in a coil of iron wire of high purity under the surface of the melt. Upon the completion of the calcium-lithium additions, the melt temperature is raised to about 2750° to about 2800° F. and 0.50% boron added if desired and the melt poured and cast into convenient shapes and sizes. The boron may be added as ferro-boron or other suitable boron compound.

The composition ranges given in the two preceding paragraphs are preferred amounts for most conditions. It is possible, however, to obtain satisfactory sound, dense deposits having a Brinell hardness of at least 550 over a considerably broader composition range. Thus, in Table V the analyses of a number of welding rods are compiled which will give satisfactory overlays having a Brinell hardness exceeding 550 when laid down by proper procedure as described herein.

Table V

| Rod No. | Deposited by | Composition of rod | | | | | | | |
|---|---|---|---|---|---|---|---|---|---|
| | | TC | Si | Mn | Ni | Cr | B | Al | CaLi |
| 22 | E | 4.0 | 1.0 | 0.4 | 3.5 | 1.25 | 0.25 | 0.5 | -- |
| 23 | E | 3.0 | 1.0 | 0.4 | 3.75 | 1.25 | 0.25 | 0.5 | -- |
| 24 | E | 2.5 | 1.0 | 0.4 | 3.75 | 1.25 | 0.5 | 0.5 | -- |
| 25 | E | 2.0 | 1.0 | 0.4 | 4.50 | 2.25 | 0.5 | 0.5 | -- |
| 26 | E | 2.7 | 0.4 | 0.25 | 2.0 | 1.50 | 0.5 | 0.5 | -- |
| 27 | E | 3.2 | 1.0 | 1.25 | 2.0 | 1.50 | 0.5 | 0.5 | -- |
| 28 | E | 3.0 | 2.5 | 0.4 | 3.75 | 2.50 | 0.5 | 0.5 | -- |
| 29 | E | 3.4 | 1.0 | 0.4 | 3.75 | 1.25 | -- | 0.5 | -- |
| 30 | E | 3.4 | 1.0 | 0.4 | 3.75 | 1.25 | -- | 0.15 | -- |
| 31 | E | 3.5 | 0.5 | 0.4 | 3.75 | .5 | 1.0 | 1.0 | -- |
| 32 | R | 4.0 | 1.0 | 0.4 | 3.0 | 1.0 | -- | -- | 0.2 |
| 33 | R | 2.5 | 1.0 | 0.25 | 5.0 | 2.5 | -- | -- | 0.2 |
| 34 | R | 3.3 | 0.4 | 0.25 | 4.5 | 1.5 | -- | -- | 0.5 |
| 35 | R | 3.5 | 1.5 | 0.25 | 4.5 | 1.5 | 0.5 | -- | 0.2 |
| 36 | R | 3.3 | 1.0 | 1.5 | 2.5 | 1.5 | -- | -- | 0.5 |
| 37 | E | 3.4 | 2.8 | 0.45 | 4.44 | 1.6 | -- | 0.5 | -- |
| 38 | E | 3.4 | 2.5 | 0.45 | 5.5 | 1.5 | -- | 0.5 | -- |
| 39 | E | 3.4 | 2.5 | 0.45 | 6.5 | 1.5 | -- | 0.5 | -- |

E=Electric arc with reversed polarity.
R=Reducing oxy-acetylene flame.
--=Not added to the composition.

On the basis of these and other experiments, the ranges which have been found to be satisfactory are approximately as follows:

| | |
|---|---|
| Total carbon | 2.0 –4.0 |
| Silicon | 0.25–3.0 |
| Nickel | 2.0 –7.0 |
| Chromium | 0.25–3.0 |
| Manganese | 0.10–1.5 |
| Phosphorus | 0.30 max. |
| Sulphur | 0.20 max. |
| Boron | 0 –1.0 |
| Aluminum | 0.15–1.0 |
| or Calcium 0.1–0.5 and Lithium 0.1–0.5 (about 0.15 to 1.0% calcium-lithium) | |
| Iron | Balance |

In welding rods to be used for laying down hard overlays by reducing oxy-acetylene flame the silicon content should not exceed about 2%, and in such rods nickel need not be greater than about 5%. Other elements such as molybdenum, tungsten, vanadium, etc., may be present in small quantities with beneficial results in some instances, as those skilled in the art will understand.

In making deposits of the character described herein, it has been found that when articles small in size are to be surfaced, it is sufficient to clean the article thoroughly and remove from the surface of the article oxide, scale, grease, foreign matter, dirt, etc. After cleaning, a small rod (say about ¼″ diameter) of the nickel-chromium cast iron, containing aluminum or aluminum and boron, may be made one electrode of a welding machine and the work the other. Weld metal deposited in the usual manner was sound and adhered tenaciously to the work piece. It has been found that when the articles to be surfaced are massive the foregoing procedure has to be modified to obtain satisfactory adherence. For example, when coating articles about 4″ x 4″ x 12″ in size with nickel cast iron containing aluminum and boron, it was found necessary to preheat the articles before depositing the overlay from a ¼″ rod in order to get a tenacious bond. If larger rods, e. g., ⁵⁄₁₆″ or ⅜″ in diameter, were used at higher current densities than was possible with a ¼″ rod whereby more heat was produced, it was possible to lay down satisfactory deposits without preheating the foundation metal. For example, a sound tenacious coating was deposited on a 10″ x 10″ x 22″ steel block with a ⅜″ diameter rod utilizing a current of 420 amperes without first preheating the base. Alternatively, the use of a carbon arc also gave satisfactory results. Nevertheless, the use of the carbon arc is not highly desirable due to the slowness with which it is necessary to deposit the overlay.

To ensure a rapid method of depositing sound tenacious overlays using the electric arc, it was found necessary to correlate the cross-section of the welding rod with the current density and the mass of the foundation metal. A critical amperage was required for each size rod, the lower current limit being that which would supply adequate heat to avoid general unsoundness and fusion line porosity, while the upper current limit was determined by the overheating of the rod and the wildness of the arc. In addition, the polarity of the rod electrode had to be reversed, i. e., the welding rod had to be positive. For example, it has been found that a current amperage above about 190 amperes with a ¼ inch diameter results in the rod overheating and damaging the holder. As the result of numerous tests, it has been found that the following size rods give satisfactory results when used in accordance with the following tabulation:

| Size of work | Diameter of welding rod | Amperage maximum | Polarity of overlay element |
|---|---|---|---|
| | Inches | | |
| ¼″ maximum thick | ¼ | 190 | Positive. |
| ½″ to 4″ thick | ⁵⁄₁₆ | 300 | Do. |
| ½″ to 10″ thick | ⅜ | 380 to 420 | Do. |

The relationship between the diameter of the welding rod and the amperage may be approximately stated by the following formula:

$$y = 1760x - 250$$

where $y$ is the amperage and $x$ the diameter of the rod in inches. Welding rods of larger diameter should be used where the mass or thickness of the foundation metal is large and the preheating step is omitted.

When deposits are laid down by use of a gas flame, it has been found that the following procedure has given satisfactory results:

The work is first cleaned thoroughly of all rust, scale and foreign matter. The steel or cast iron articles are then pre-heated to a dull red heat with care to avoid overheating at the edges and corners. The torch is then adjusted to give an excess acetylene flame with the reducing flame about two and a half to three times the length of the inner cone. The metal to be deposited is sweated on to the base. It has been found that a little "digging in" on cast iron bases is advantageous in procuring tenacious, adherent, gas-free deposits. The metal should be deposited quickly and easily with avoidance of excessive puddling or dilution with the base. In addition all particles of oxide and scale should be floated.

Overlaying elements containing about 0.5% calcium-lithium additions to the base nickel-chromium cast iron having a maximum phosphorus content of about 0.20% have been employed to produce overlays having a hardness usually within the range of about 550–650 Brinell and with excellent workability and being dense, gas-free and strongly adherent to the base whether steel or cast iron. Overlay elements containing about 0.5% boron and about 0.5% calcium-lithium additions to the base nickel-chromium cast iron have been employed to produce overlays by the gas flame which are sound and tenacious and have a Brinell hardness of about 650–720.

There is no essential difference in the metallographic structure of a welded overlay and of the bond formed with a steel base when the overlay is deposited by the electric arc method or by the gas flame method, as described hereinbefore. Microscopic examination of polished and etched sections through overlays deposited by both methods on a steel base of the S. A. E. 1015 type showed the presence of several layers or strata characterized by different grain structure. These layers or strata are depicted schematically in Fig. 1, in which reference numeral 10 represents the layer of the steel base which is substantially unaffected by the welding operation, 12 designates the outer layer of the base which has been modified as pointed out hereinafter as a result of the welding operation, 14 denotes the inner layer of the overlay immediately adjacent to the steel base, and 16 indicates the outer layer of the overlay.

In Figs. 2, 3 and 4 the grain structure of representative portions of a welded overlay bonded to a hypoeutectoid steel base has been reproduced from photomicrographs taken substantially in the regions designated by numerals 2, 3 and 4 in Fig. 1, respectively.

The steel base 10, as may be seen in Fig. 4, comprises grains of ferrite and grains of pearlite characteristic of hypoeutectoid steels. In the region 12 adjacent to the weld metal, the steel base has been modified, as clearly depicted in Figs. 2 and 3, due probably to the heat effect of welding and to diffusion of carbon into the base metal from the cast iron weld metal during the welding operation. The change from the pearlitic-ferritic structure shown in Fig. 4 is gradual, as may be observed by studying Figs. 2 and 3. The first noticeable change is a gradual increase in the amount of pearlite until the ferrite disappears. The structure then changes gradually from lamellar pearlitic structure into sorbite and finally into troostite, as may be seen in Figs. 2 and 3. The surface of the steel base is clearly defined in Fig. 2 as the dark layer of troostite, and the intimate nature of the bond between the weld metal and the steel base is clearly depicted in that figure.

The layer of the weld metal adjacent to the steel base is largely austenite with some martensitic needles embedded in the austenitic matrix. See Fig. 2. The remainder of the weld metal is largely carbide and martensite, and in certain instances some austenite. The upper layer of Fig. 2 is quite typical of the hard weld metal. In the specimen illustrated in Fig. 2 the weld metal was laid down from a 1/16" weld rod on a steel base about 1/2" x 3" x 6" at a current density of about 300 amperes. The composition of the weld rod was approximately as follows:

| | Per cent |
|---|---|
| Total carbon | 3.71 |
| Silicon | 1 |
| Nickel | 3.75 |
| Chromium | 1.25 |
| Manganese | 0.4 |
| Sulphur | 0.05 |
| Phosphorus | 0.15 |
| Boron | 0.5 |
| Aluminum | 0.5 |
| Iron | Essentially the balance |

Substantially the same results were obtained when the overlay was deposited by a reducing oxy-acetylene flame from a weld rod of approximately the following analysis:

| | Per cent |
|---|---|
| Total carbon | 3.59 |
| Silicon | 1.06 |
| Nickel | 4.5 |
| Chromium | 1.43 |
| Manganese | 0.36 |
| Calcium-lithium | 0.5 |
| Phosphorus | 0.13 |
| Sulphur | 0.05 |
| Iron | Essentially the balance |

The gradual transition in structure from the base metal to the welded overlay hereinbefore described and illustrated assures a satisfactory adherent bond between the base metal and the welded overlay.

There is a similar transition in the metallographic structure from the unaffected base metal to the welded overlay when overlay metal is deposited on a cast iron base as described hereinbefore. The resulting structure is schematically depicted in Fig. 5 in which reference numeral 20 denotes the cast iron base which has not been substantially affected by the welding operation, 22 designates the outer layer of the base metal which has been modified as a result of the welding operation, as more fully set forth hereinafter, 24 represents the inner layer of the overlay, and 26 indicates the outer layer of the overlay metal.

In Figs. 6, 7, 8 and 9 the grain structure of representative portions of a welded overlay bonded to a cast iron base has been reproduced from photomicrographs taken substantially in the regions designated by numerals 6, 7, 8 and 9 in Fig. 5, respectively. The cast iron base had approximately the following composition:

| | Percent |
|---|---|
| Total carbon | 3.25 |
| Silicon | 2.25 |
| Sulphur | 0.10 |
| Phosphorus | 0.20 |
| Iron | Essentially the balance |

After preliminary "digging in", the overlay was deposited by an oxy-acetylene flame under reducing conditions from welding rods containing the following elements:

| | | Percent |
|---|---|---|
| Total carbon | about | 3.59 |
| Silicon | do | 1.06 |
| Nickel | do | 4.5 |
| Chromium | do | 1.43 |
| Manganese | do | 0.36 |
| Sulphur | do | 0.05 |
| Phosphorus | do | 0.13 |
| Calcium-lithium | do | 0.5 |
| Iron | Essentially the balance | |

The cast iron base 20, as may be seen in Fig. 9, comprises grains of ferrite, grains of pearlite and sorbite, and graphite flakes characteristic of gray cast irons. In the region 22 adjacent to the weld metal, the structure of the cast iron base changes gradually into sorbite-troostite, but the line of demarkation between the base metal and the overlay metal is not sharp, as may be seen in Fig. 6. The inner layer of the overlay is shown at higher magnification in Fig. 8, from which it is evident that the structure is predominantly sorbite-carbide and that the carbide increases toward the outer layer of the overlay. This outer layer, as may be seen in Fig. 7, is largely martensite and carbide. The intimate nature of the bond between the cast iron base and the overlay is clearly depicted in these figures.

An examination of the coated articles demonstrates that the present invention is entirely satisfactory. The new overlays are dense and gas-free. The deposits adhere strongly and tenaciously to the base and do not spall off. Where a plurality of overlays are deposited in superimposed position adherence between nethermost layer and the base is excellent, as is the adherence between successive overlays. At the same time the deposits are dense and gas-free. The welding rods, moreover, have relatively low alloy content and may be manufactured at reasonable cost.

Although the present invention has been described in conjunction with preferred embodiments thereof, it is to be understood that variations and modifications may be resorted to as will be readily understood by those skilled in the art. In the above description and the following claims the terms "balance iron" or "balance essentially iron" are used to signify that iron is the preponderating element in addition to those specifically designated, but the presence of small amounts of impurities or of other alloying elements added in usual amounts for known purposes is by no means excluded.

We claim:

1. A composite metallic article comprising a low carbon steel base and a sound, dense, welded overlay of high hardness intimately bonded to said base, said overlay having been deposited from a welding rod comprising about 2.0 to 4.0% carbon; about 0.25 to 2.0% silicon; about 2.0 to 5.0% nickel; about 0.25 to 3.0% chromium; about 0.10 to 1.5% manganese; sulphur and phosphorus not in excess of 0.20% and 0.30% respectively; about 0.15 to 1.0% of a deoxidizer selected from the group consisting of aluminum and calcium-lithium; from 0 to about 1% boron; and the balance essentially iron, the article being characterized by a gradual transition from the ferritic and pearlitic structure of the base metal through a band of troostite and a band of martensite and austenite to the welded overlay having a structure comprised of carbide and martensite.

2. A composite metallic article comprising a gray cast iron base and a sound, dense, welded overlay of high hardness intimately bonded to said base, said overlay having been deposited from a welding rod comprising about 2.0 to 4.0% carbon; about 0.25 to 2.0% silicon; about 2.0 to 5.0% nickel; about 0.25 to 3.0% chromium; about 0.10 to 1.5% manganese; sulphur and phosphorus not in excess of 0.20% and 0.30% respectively; about 0.15 to 1.0% of a deoxidizer selected from the group consisting of aluminum and calcium-lithium; from 0 to about 1% boron; and the balance essentially iron, the article being characterized by a gradual transition from gray cast iron structure of the base through a band of sorbite-troostite and a band of sorbite-carbide to the welded overlay having a structure comprised of carbide and martensite.

3. A composite metallic article comprising a normal zone of ferrous metal extending throughout a substantial part of the body of the article; a sound, dense, welded overlay of high hardness; and an intermediate zone between said welded overlay and said normal zone, said intermediate zone exhibiting a transition in structure from the structure of the normal zone to the structure of the welded overlay produced by diffusion of the constituents of a welding rod comprising about 2.0 to 4.0% carbon; about 0.25 to 3.0% silicon; about 2.0 to 7.0% nickel; about 0.25 to 3.0% chromium; about 0.10 to 1.5% manganese; sulphur and phosphorus not in excess of 0.20% and 0.30% respectively; about 0.15 to 1.0% of a deoxidizer selected from the group consisting of aluminum and calcium-lithium; from 0 to about 1% boron; and the balance essentially iron, into the base metal during welding.

4. A composite metallic article comprising a normal zone of hypoeutectoid steel extending throughout a substantial part of the body of the article; a sound, dense, welded overlay of high hardness; and an intermediate zone between said welded overlay and said normal zone, said intermediate zone exhibiting transition in structure from the ferritic and pearlitic structure of the normal zone to the structure of the welded overlay produced by diffusion of the constituents of a welding rod comprising about 2.0 to 4.0% carbon; about 0.25 to 2.0% silicon; about 2.0 to 5.0% nickel; about 0.25 to 3.0% chromium; about 0.10 to 1.5% manganese; sulphur and phosphorus not in excess of 0.20% and 0.30 respectively; about 0.15 to 1.0% of a deoxidizer selected from the group consisting of aluminum and calcium-lithium; from 0 to about 1% boron; and the balance essentially iron, into the base metal during welding.

5. A welding rod for producing hard overlays by electric arc welding comprising about 3.5% carbon, about 1% silicon, about 3.75% nickel, about 1.25% chromium, about 0.4% manganese, sulphur not in excess of about 0.10%, phosphorus not more than about 0.20%, aluminum about 0.5%, boron about 0.5%, and the balance essentially iron.

6. A welding rod for producing hard overlays by electric arc welding comprising about 3.30 to 3.75% carbon, about 0.70 to 1.0% silicon, about 3.50 to 3.80% nickel, about 1.15% to 1.45% chromium, about 0.25 to 0.50% manganese, sulphur and phosphorus not to exceed about 0.10% and 0.20% respectively, about 0.15 to 0.50% aluminum, about 0.15 to 0.50% boron, and the balance essentially iron.

7. A welding rod for producing hard overlays by electric arc welding comprising about 2.0 to 4.0% carbon, about 0.25 to 3.0% silicon, about 2.0 to 7.0% nickel, about 0.25 to 3.0% chromium, about 0.10 to 1.5% manganese, sulphur and phosphorus not in excess of 0.20% and 0.30% respectively, about 0.15 to 1.0% aluminum, from 0 to about 1.0% boron and the balance essentially iron.

8. A welding rod for producing hard overlays by gas flame welding comprising about 3.5% carbon, about 1% silicon, about 4.5% nickel, about 1.5% chromium, about 0.4% manganese, sulphur not in excess of about 0.10%, phosphorous not more than about 0.20%, calcium about 0.10%, lithium about 0.10%, boron about 0.5%, and the balance essentially iron.

9. A welding rod for producing hard overlays by gas flame welding comprising about 3.30 to 3.60% carbon, about 0.70 to 1.0% silicon, about 4.30 to 4.65% nickel, about 1.40 to 1.70% chromium, about 0.25 to 0.50% manganese, sulphur and phosphorus not to exceed about 0.10% and 0.20% respectively, about 0.15 to 0.50% of calcium-lithium, about 0.15 to 0.50% boron and the balance essentially iron.

10. A welding rod for producing hard overlays by gas flame welding comprising about 2.0 to 4.0% carbon, about 0.25 to 2.0% silicon, about 2.0 to 5.0% nickel, about 0.25 to 3.0% chromium, about 0.10 to 1.5% manganese, sulphur and phosphorus not in excess of 0.20% and 0.30% respectively, about 0.15 to 1.0% calcium-lithium, from 0 to about 1.0% boron and the balance essentially iron.

11. A welding rod for producing hard overlays by electric arc welding comprising about 3.5% carbon, about 1% silicon, about 3.75% nickel, about 1.25% chromium, about 0.4% manganese, sulphur not in excess of about 0.10%, phosphorus not more than about 0.20%, aluminum about 0.5%, and the balance essentially iron.

12. A welding rod for producing hard overlays by electric arc welding comprising about 3.30 to 3.75% carbon, about 0.70 to 1.0% silicon, about 3.50 to 3.80% nickel, about 1.15 to 1.45% chromium, about 0.25 to 0.50% manganese, sulphur and phosphorus not to exceed about 0.10% and 0.20% respectively, about 0.15 to 0.50% aluminum, and the balance essentially iron.

13. A welding rod for producing hard overlays by electric arc welding comprising about 2.0 to 4.0% carbon, about 0.25 to 3.0% silicon, about 2.0 to 7.0% nickel, about 0.25 to 3.0% chromium, about 0.10 to 1.5% manganese, sulphur and phosphorus not in excess of 0.20% and 0.30% respectively, about 0.15 to 1.0% aluminum, and the balance essentially iron.

14. A welding rod for producing hard overlays by gas flame welding comprising about 3.5% carbon, about 1% silicon, about 4.5% nickel, about 1.5% chromium, about 0.4% manganese, sulphur not in excess of about 0.10%, phosphorus not more than about 0.20%, calcium about 0.10%, lithium about 0.10%, and the balance essentially iron.

15. A welding rod for producing hard overlays by gas flame welding comprising about 3.30 to 3.60% carbon, about 0.70 to 1.0% silicon, about 4.30 to 4.65% nickel, about 1.40 to 1.70% chromium, about 0.25 to 0.50% manganese, sulphur and phosphorus not to exceed about 0.10% and 0.20% respectively, about 0.15 to 0.50% of calcium-lithium, and the balance essentially iron.

16. A welding rod for producing hard overlays by gas flame welding comprising about 2.0 to 4.0% carbon, about 0.25 to 2.0% silicon, about 2.0 to 5.0% nickel, about 0.25 to 3.0% chromium, about 0.10 to 1.5% manganese, sulphur and phosphorus not in excess of 0.20% and 0.30% respectively, about 0.15 to 1.0% calcium-lithium, and the balance essentially iron.

17. A welding rod for producing hard overlays by welding comprising about 2.0 to 4.0% carbon; about 0.25 to 2.0% silicon; about 2.0 to 5.0% nickel; about 0.25 to 3.0% chromium; about 0.10 to 1.5% manganese; sulphur and phosphorus not in excess of 0.20% and 0.30% respectively; about 0.5% of a deoxidizer selected from the group consisting of aluminum and calcium-lithium; about 0.5% boron; and the balance essentially iron.

18. A welding rod for producing hard overlays by welding comprising about 2.0 to 4.0% carbon; about 0.25 to 2.0% silicon; about 2.0 to 5.0% nickel; about 0.25 to 3.0% chromium; about 0.10 to 1.5% manganese; sulphur and phosphorus not in excess of 0.20% and 0.30% respectively; about 0.15 to 0.50 of a deoxidizer selected from the group consisting of aluminum and calcium-lithium; about 0.15 to 0.5% boron; and the balance essentially iron.

19. A cast iron welding rod for producing sound overlays having a hardness of at least about 550 Brinell comprising as essential elements in combination with iron about 2.0 to 4.0% carbon; about 0.25 to 2.0% silicon; about 2.0 to 5.0% nickel; about 0.25 to 3.0% chromium; about 0.10 to 1.5% manganese; and about 0.15 to 1.0% of a deoxidizer selected from the group consisting of aluminum and calcium-lithium.

20. A welding rod for producing hard overlays by welding comprising about 2.0 to 4.0% carbon; about 0.25 to 2.0% silicon; about 2.0 to 5.0% nickel; about 0.25 to 3.0% chromium; about 0.10 to 1.5% manganese; sulphur and phosphorus not in excess of 0.20% and 0.30% respectively; about 0.5% of a deoxidizer selected from the group consisting of aluminum and calcium-lithium; and the balance essentially iron.

21. A welding rod for producing hard overlays by welding comprising about 2.0 to 4.0% carbon; about 0.25 to 2.0% silicon; about 2.0 to 5.0% nickel; about 0.25 to 3.0% chromium; about 0.10 to 1.5% manganese; sulphur and phosphorus not in excess of 0.20% and 0.30% respectively; about 0.15 to 0.50% of a deoxidizer selected from the group consisting of aluminum and calcium-lithium; and the balance essentially iron.

22. A welding rod for producing hard overlays by welding comprising about 2.0 to 4.0% carbon; about 0.25 to 2.0% silicon; about 2.0 to 5.0% nickel; about 0.25 to 3.0% chromium; about 0.10 to 1.5% manganese; sulphur and phosphorus not in excess of 0.20% and 0.30% respectively; about 0.15 to 1.0% of a deoxidizer selected from the group consisting of aluminum and calcium-lithium; and the balance essentially iron.

JOHN TRIMBLE EASH.
THOMAS J. WOOD.